United States Patent [19]
Von Essen et al.

[11] Patent Number: 5,653,203
[45] Date of Patent: Aug. 5, 1997

[54] RECIPROCATING PISTON ENGINE HAVING A MASS-BALANCING ARRANGEMENT

[75] Inventors: Mathias Von Essen, Alsdorf; Christoph Bollig, Stolberg; Werner Bick, Wuerselen, all of Germany

[73] Assignee: FEV Motorentechnik GmbH & Co. Kommanditgesellschaft, Aachen, Germany

[21] Appl. No.: 596,208

[22] PCT Filed: Jun. 14, 1995

[86] PCT No.: PCT/EP95/02310

§ 371 Date: Feb. 14, 1996

§ 102(e) Date: Feb. 14, 1996

[87] PCT Pub. No.: WO95/34770

PCT Pub. Date: Dec. 21, 1995

[30] Foreign Application Priority Data

Jun. 14, 1994 [DE] Germany ................ 9409531 U

[51] Int. Cl.$^6$ ................................................. F02B 75/06
[52] U.S. Cl. ................................................. 123/192.2
[58] Field of Search ................................... 123/192.2

[56] References Cited

U.S. PATENT DOCUMENTS

| | | | |
|---|---|---|---|
| 1,738,877 | 12/1929 | Edwards et al. | 74/604 |
| 1,794,715 | 3/1931 | Knight | 74/604 |
| 4,351,202 | 9/1982 | Summers | 123/192.2 |

FOREIGN PATENT DOCUMENTS

| | | |
|---|---|---|
| 841736 | 5/1939 | France . |
| 546733 | 3/1932 | Germany . |
| 1576245 | 5/1970 | Germany . |
| 23 33 038 | 1/1975 | Germany . |
| 58-102842 | 6/1983 | Japan . |
| 262914 | 12/1926 | United Kingdom . |

*Primary Examiner*—Noah P. Kamen
*Attorney, Agent, or Firm*—Spencer & Frank

[57] ABSTRACT

A reciprocating piston engine includes a housing; a cylinder disposed in the housing; a piston guided for reciprocation within the cylinder; a crankshaft connected to the piston for effecting a guided reciprocation thereof within the cylinder; at least two camplates connected to the crankshaft such that they rotate together with the crankshaft, each camplate defining a control contour thereon; two balancing masses operatively coupled to the camplates such that the camplates are effective for actuating respective ones of the balancing masses, each balancing mass comprising a pivoting arm; and coupling means connecting the balancing masses to one another thereby effecting a forced reciprocation thereof as a function of a rotation of the crankshaft. The coupling means include: two pivoting shafts disposed on each side of the crankshaft and extending parallel thereto, each pivoting shaft being connected to at least one balancing mass, each balancing mass being aligned in a direction of a main extension thereof perpendicularly with respect to each pivoting shaft; and coupling components connecting the pivoting shafts to one another.

7 Claims, 5 Drawing Sheets

RECIPROCATING PISTON ENGINE HAVING A MASS-BALANCING ARRANGEMENT

BACKGROUND OF THE INVENTION

1. Field of the Invention

The invention relates to a reciprocating piston engine, in particular an internal combustion engine, having at least one cylinder in which a piston connected to a crankshaft is reciprocatingly guided.

2. Description of the Prior Art

In reciprocating piston engines of the kind described above, a great variety of auxiliary units, including balancing masses which, in the context of the present invention, are considered as constituting auxiliary units, are driven by the crankshaft either directly or with the interposition of kinematic, positively engaging connections. Balancing masses for the balancing of free forces of gravity of a reciprocating piston engine of the above kind are provided in the form of rotating balance weights which, depending upon their intended use, are also provided in gear wheels connected to the crankshaft for driving supplementary and/or other auxiliary units.

SUMMARY OF THE INVENTION

The object of the invention is to create a reciprocating piston engine of the kind described above in the body of which auxiliary units, and, in particular, balancing masses, may be disposed, and where at least a desired motion of the masses may be derived through actuation with kinematic, positively engaging connections inside the body of the engine.

The above object is achieved according to the invention by a mass balancing arrangement where the crankshaft is connected to at least two cams having a control contour and rotating along with the crankshaft, each of the cams acting upon at least one balancing mass as actuation means therefor, the balancing masses being force-guided to be movable back and forth as a function of the crankshaft rotation. This arrangement has the advantage that cam plates of the above kind can be accommodated inside the engine housing in the area of the crankshaft chamber, namely because the cam plates can be directly connected to the crankshaft, each with a control contour which is matched to the respective intended use thereof. In corresponding intended uses of the above arrangement, the cam plates can also each be connected to the crankshaft on the outside of the engine body. The required dynamic effect necessary for actuating the auxiliary unit or units, the balancing masses in this case, can be achieved directly by the control contour. The above may also be achieved by disposing the cam plate with its control contour inside the engine housing and the auxiliary unit outside the engine housing, wherein corresponding transfer means are provided between the cam plate and the auxiliary unit which pass through the wall of the engine housing. It is possible with the aid of such masses, which are guided to be movable back and forth, to balance forces of gravity produced by the connecting rod and the piston directly at the location where they are produced. Such forces of gravity may be produced where a cam plate is disposed directly on the crank, in which case the affiliated balancing mass must be provided in the reciprocating engine in the same effective direction, but with a course of motion opposite to that of the piston. The balancing mass can be respectively guided in a purely translational motion, preferably in a pivoting motion. In particular, in multi-cylinder in-line reciprocating piston engines, it is possible to provide balancing masses of the above kind still inside the engine housing respectively in the area of the crankshaft ends. The above arrangement results in a balancing of the free moments of inertia of the first and higher orders by means of a corresponding dimensioning of the pair of balancing masses. Since the balancing masses are disposed as close as possible to the crankshaft ends, the compensation masses as a whole can be kept relatively low. The further advantage of the embodiment according to the invention is that the motion of the balancing masses can be predetermined via the control contour of the cam plate. In the simplest embodiment, the cam plate has a circular contour and is connected eccentrically to the rotational axis of the crankshaft. In a multi-cylinder engine, for example in an in-line engine exhibiting a balancing of the free moments of inertia by means of a balancing mass pair, the eccentricity is such that the moment of inertia exerted by the balancing masses is directed counter to the moment of inertia of the oscillating parts of the engine-transmission unit. To produce the required return motion, a mechanical coupling is provided such that the masses are force-guided in both movement directions back in the opposite movement direction by the control contours, any resonance thereby being practically prevented. The arrangement may be embodied such that when a preselectable speed is exceeded, the balancing masses are stopped and/or disengaged from the control contour.

A further advantage of the invention in connection with balancing masses as an auxiliary unit is that, with an appropriate embodiment of the control contour, it is possible in a space saving manner to balance free moments of inertia and forces of gravity of higher orders by means of additional balancing masses. These additional balancing masses can be disposed practically in the same rotational plane as the balancing masses for balancing the free moments of the first order. Here, too, the movement of the balancing masses can be derived directly from the crankshaft via the cam plate. In comparison with embodiments leading to a rotational imbalance, the degree of freedom is more favorable in the embodiment of the mass balancing arrangement according to the invention.

In a suitable embodiment of the invention, the course of the control contour is continuous. As a result of the above, jumps in speed and/or acceleration are prevented in the motion transfer to the balancing mass.

In an advantageous embodiment, two pivoting shafts are provided. The shafts run parallel to both sides of the crankshaft and are operationally connected to each other via coupling means, wherein at least one balancing mass, which is embodied as a pivoting arm and is aligned with its main extension perpendicular to the axis of the corresponding pivoting shaft, is connected to at least one pivoting shaft. The above arrangement allows an optimal matching of the above balancing mass system with regard to the kinematics, kinetics, and weight thereof, to the moments of inertia to be balanced. Specifically, a corresponding determination of the desired spacings between the pivot axis predetermined by the pivoting shaft, the engagement point of the control contour, and the center of gravity may be effected.

In an advantageous embodiment of the invention, each coupling means has at least one transfer body connected to a pivoting shaft and an inelastic coupling element which positively connects both transfer bodies. Thus, it is possible to positively guide both balancing masses with positive engagement via the pivoting shafts on the one hand and via the control curve on the other. The transfer bodies can for example include at least one lever on each pivoting shaft connected to each other via a coupling rod. A reciprocating motion of the balancing masses in opposite directions as well as in the same direction is brought about by a corresponding alignment of the levers. Gear wheels may also be used as transfer bodies operationally and positively connected to each other via corresponding coupling gear wheels serving as coupling elements.

In a different embodiment, each transfer body includes a positive engagement wheel. A coupling element is further provided. The coupling element is endless and inelastic, but can be deflected in at least one direction and winds around both positive engagement bodies, positively engaging the same. The positive engagement wheels can be toothed wheels and the coupling element can be a chain or a toothed belt. It is practical to connect the coupling element to an adjusting means for changing the working length thereof. The above allows a precise adjustment of the system, by means of which a play-free guidance of the overall arrangement is possible. When a chain or a toothed belt are used, the adjusting means may be a corresponding tensioning device.

In an advantageous embodiment of the invention, the balancing mass, which includes a pivoting arm, has a recess in the area of its free end, which recess encompasses the other pivoting arm. Thus, the center of gravity of the balancing mass may be disposed at the greatest possible distance from the pivoting shaft in order to realize the greatest possible center of gravity stroke of the balancing mass with a relatively small pivoting motion. The balancing mass can in this manner be distinctly reduced in weight.

In a different embodiment of the invention, a rocker lever with arms of equal length is disposed essentially parallel to the crankshaft as a means for forced guidance, and is pivotably supported on the engine housing. The free end of the rocker lever is connected to a compensation mass and the affiliated control contour. The above embodiment is of particular significance for three-cylinder engines whose balancing masses are moved in opposite directions. The forced guidance of balancing masses is easy to realize at the control contour via a rocker lever of the above kind. In this connection, it is practical if the support of the rocker lever is connected to adjustable means for tolerance compensation.

In another embodiment of the invention, it is provided that the balancing mass is operationally connected to at least one other auxiliary unit. It is particularly practical if the other auxiliary units are connected to the guide means, which may be configured as drag or tilt levers. The above leads to the possibility of covering the kinematics of the balancing masses for the covering of self functions in the reciprocating piston engine, e.g. for the supply of lubrication oil or compressed air by the auxiliary devices.

BRIEF DESCRIPTION OF THE DRAWINGS

The foregoing objects of the invention, together with other objects and advantages which may be attained by its use, will become more apparent upon reading the following detailed description of the invention taken in conjunction with the drawings. In the drawings, where like reference numerals identify corresponding components.

DETAILED DESCRIPTION OF THE INVENTION

Figure 1:
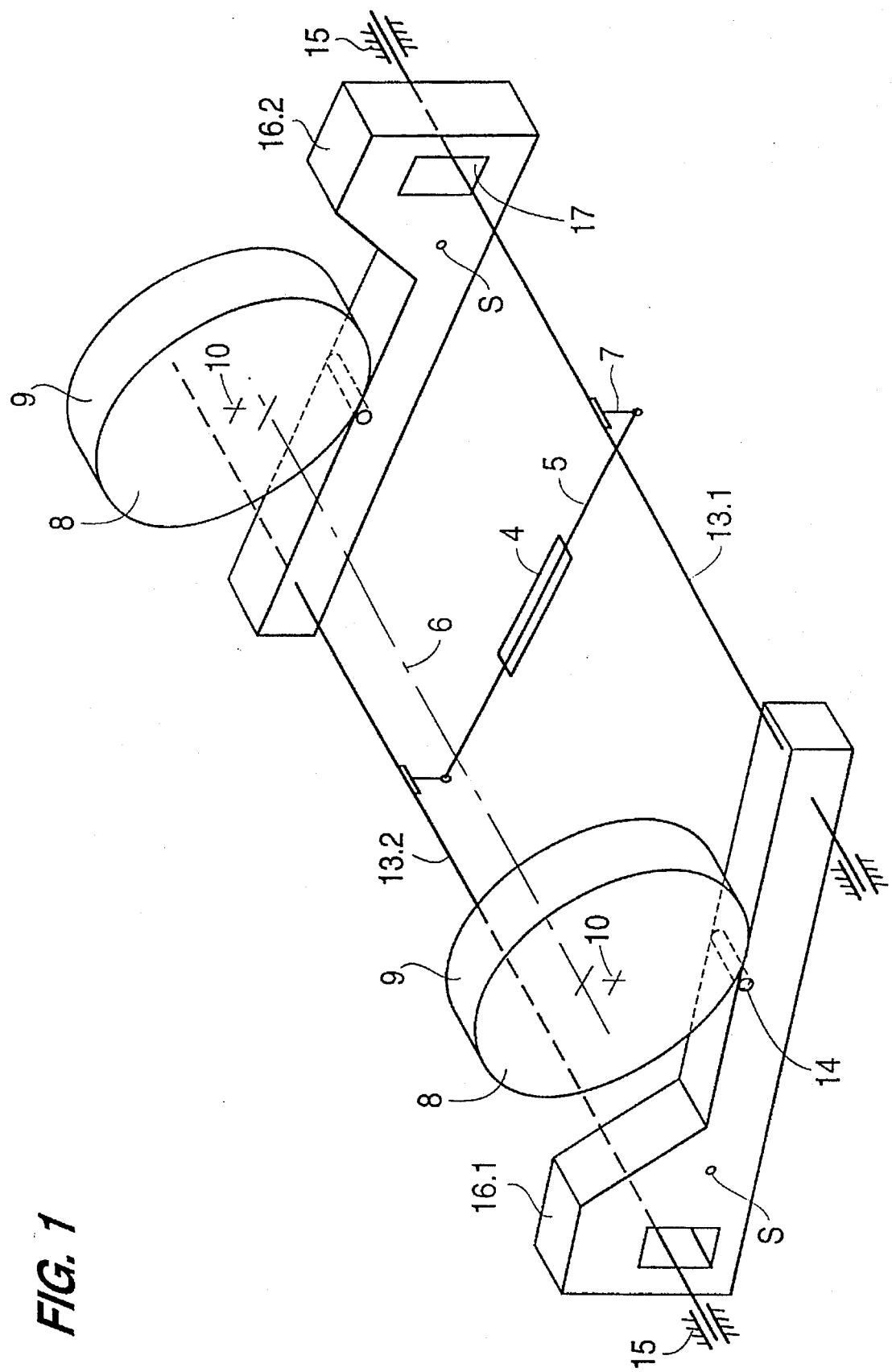
FIG. 1 schematically shows a basic design for a mass balancing arrangement according to the invention.

FIG. 1 schematically represents an exemplary embodiment for a mass balancing arrangement in a multi-cylinder engine, and, in the case of the shown embodiment, in a three-cylinder engine. The crankshaft is therefore represented only by way of its rotational axis 6. In the embodiment of FIG. 1, each end of a cam plate 8 with a control contour 9 is connected to the crankshaft. A pivotable balancing mass 16.1 and 16.2 rests against each control contour 9 via a roller element 14, which mass is supported with its other end on the engine housing 15 so that it can pivot back and forth on pivoting shafts 13.1 and 13.2.

Figure 2:
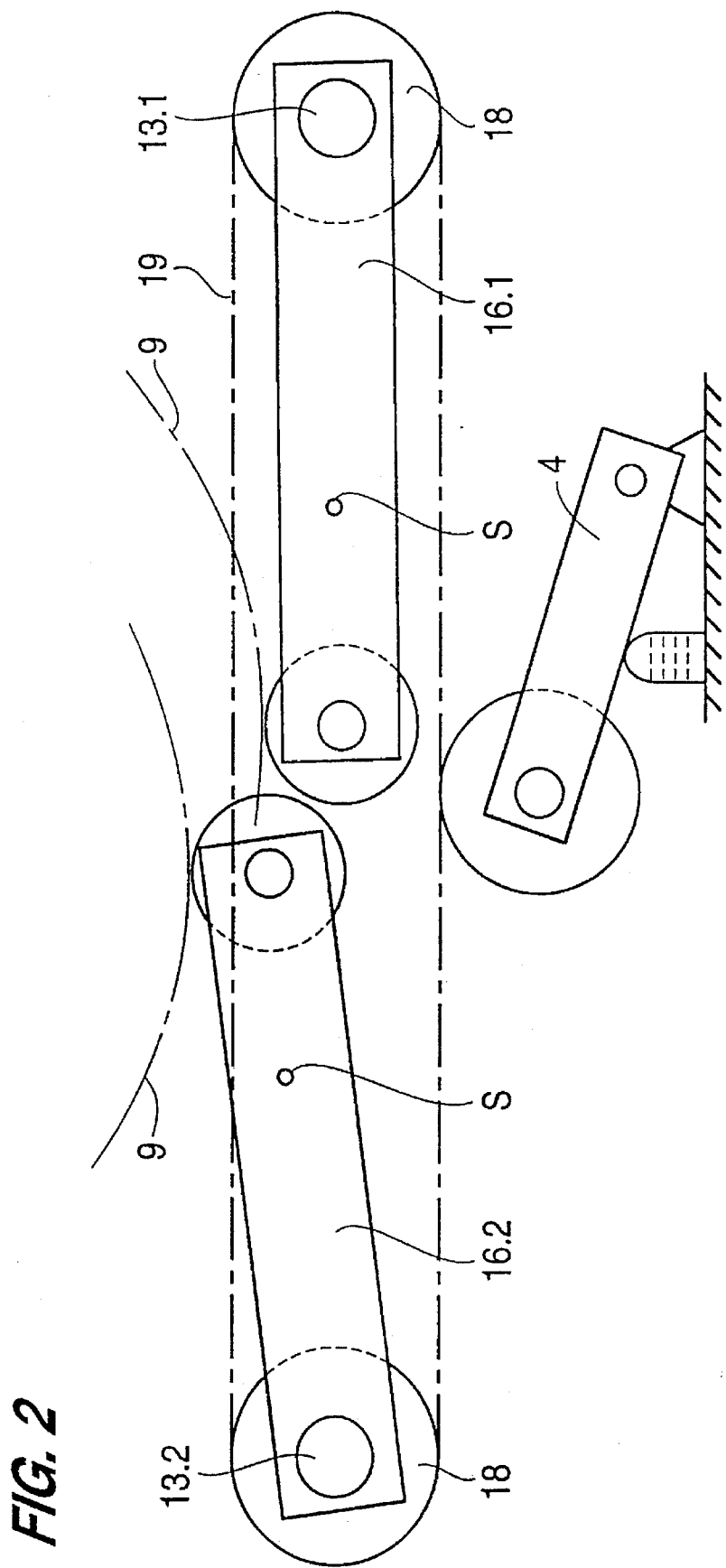
FIG. 2 is a schematic side view of the embodiment of the invention according to FIG. 1.

The schematic representation in FIG. 2 shows an arrangement in which pivoting shafts 13.1 and 13.2 extend parallel to rotation axis 6 of the crankshaft at respective sides thereof. The two pivoting shafts 13.1 and 13.2, which will be described in further detail below, are each supported on the engine housing 15. The balancing masses 16.1 and 16.2, which are embodied as pivoting arms, are fixedly connected against relative rotation with one end thereof on the associated respective pivoting shaft 13.1 and 13.2 and extend transversely to the longitudinal direction of the crankshaft beneath cam plates 8, and are further supported on the cam plate 8 via a roller element 14.

If possible, the balancing mass 16, which is embodied as a pivoting arm, is configured so that the direction of movement of its center of gravity S and therefore the effective direction of movement of the balancing mass is matched to the effective direction of the moment of inertia and/or forces of gravity to be balanced.

Since the spacing between the pivoting axis of the balancing mass 16, which is predetermined by the axis of the corresponding pivoting shaft, and the engagement point of the cam plate on the balancing mass, defined in this case by the position of the roller element allow the exertion of an effect on the lever transmission and as a result, an effect on the pivoting path of the center of gravity S, a recess 17 is provided in each of the balancing masses. The recess of each balancing mass encompasses the pivoting shaft of the other balancing mass so that the structure of the crankshaft housing is taken into account for the installation of the pivoting shafts. By dimensioning each balancing mass such that its center of gravity is at a desired position, it is possible to effect a greater center of gravity stroke at a smaller pivot angle of the balancing mass, and therefore significantly reduce the weight of the balancing mass.

The two pivoting shafts are each connected to a corresponding transfer body 7, and both transfer bodies 7 are connected to each other through a positive engagement via an inelastic coupling element 5. Thus, upon the downward motion of the balancing mass 16.1, the other balancing mass 16.2 is guided upwardly by these coupling means 5, 7 thereby following the course of the control contour. The masses are thus guided in opposite directions.

The coupling element 5 is connected to an adjusting means 4 for changing its effective length, so that the required tolerance compensation is assured.

FIG. 2 shows a simplified end view of an embodiment of the mass-balancing arrangement according to the invention. The basic design of the arrangement corresponds to the one shown in FIG. 1. To simplify the representation, the balancing masses 16.1 and 16.2 are depicted only as "levers", and the position of the centers of gravity S is only schematically indicated.

In the above example, each of the coupling means is constituted as a transfer body by a positive engagement wheel 18 which is connected to corresponding pivoting shaft 13.1 and 13.2. A chain or a toothed belt 19 serves as the transfer body and passes around both positive engagement wheels 18. A correspondingly embodied tensioning device is provided as an adjusting means 4 for changing the effective length of belt 19. The control contours 9 are disposed so that the forced guidance is produced in opposite directions. As a modification of the above, a gear wheel may be used instead of the chain or toothed belt, the gear wheel positively engaging correspondingly embodied gear wheels 18.

It is not necessary for control contour 9 of cam plate 8 to be embodied as a circle. Thus, control contour 9 can be embodied to match the desired kinematics of the auxiliary unit to be driven or the kinematics of the balancing mass. Accordingly, control contour 9 could be a continuous curve configured such that, when the crankshaft is rotated, the balancing masses always rest against the corresponding control contour in order to prevent jumps in acceleration. For example, a cam or a component having a continuous mathematical curve similar to that of a cam may be used to effect the above.

Figure 3:
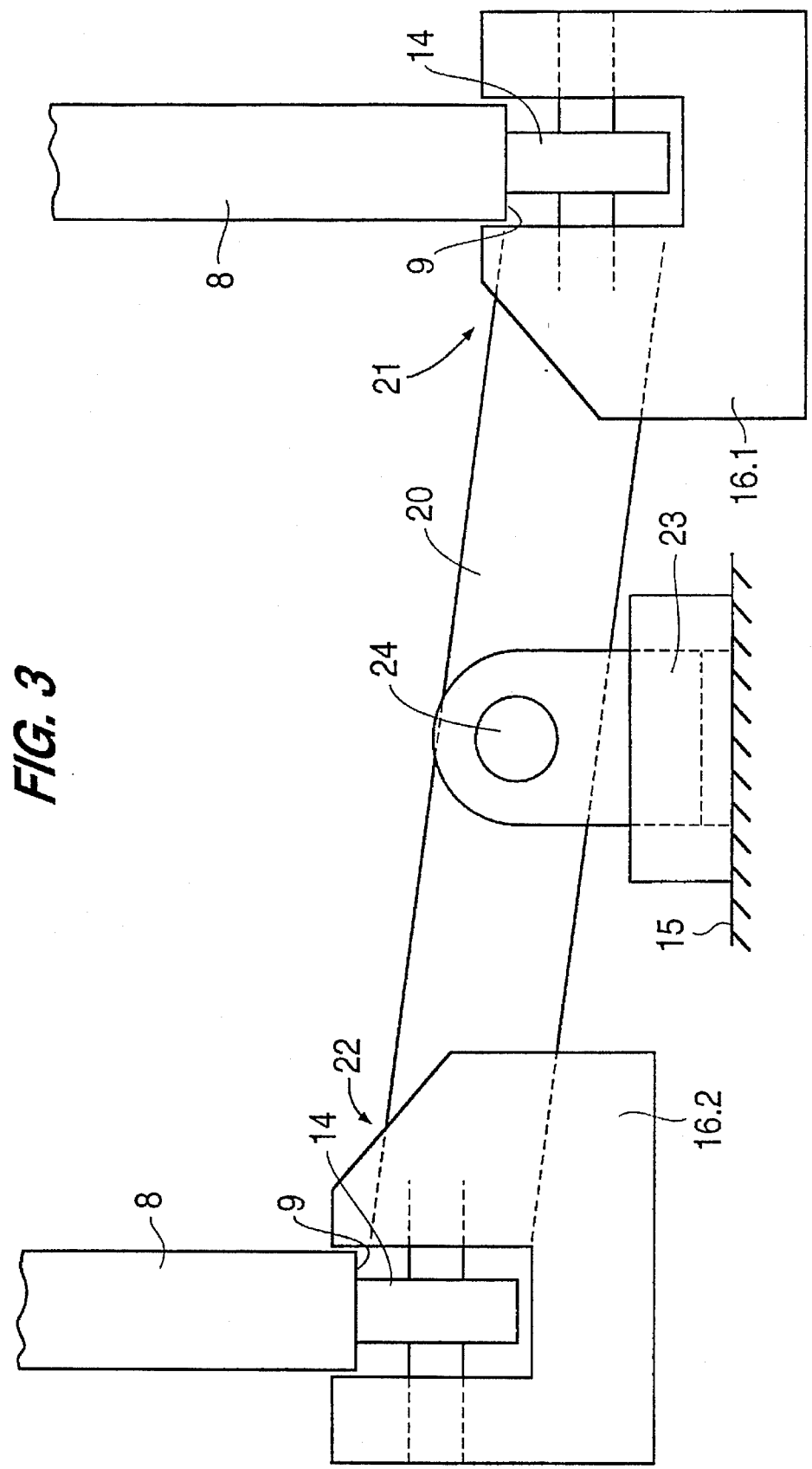
FIG. 3 is a schematic side view of the mass balancing arrangement according to the invention where the arrangement includes a rocker lever.

FIG. 3 shows an embodiment of the arrangement according to the invention where a rocker lever 20 having arms of equal length is provided. Rocker lever 20 is aligned in the longitudinal direction of the engine and is pivotably supported on the engine housing 15. Each of the free ends 21 and 22 of the rocker lever is connected to a corresponding one of the balancing masses 16.1 and 16.2, which in turn rest against the control contour 9 via rollers 14. The support 23 of the rocker lever bearing 24 comprises a means for tolerance compensation, such as a spring which can be prestressed.

Figure 4:
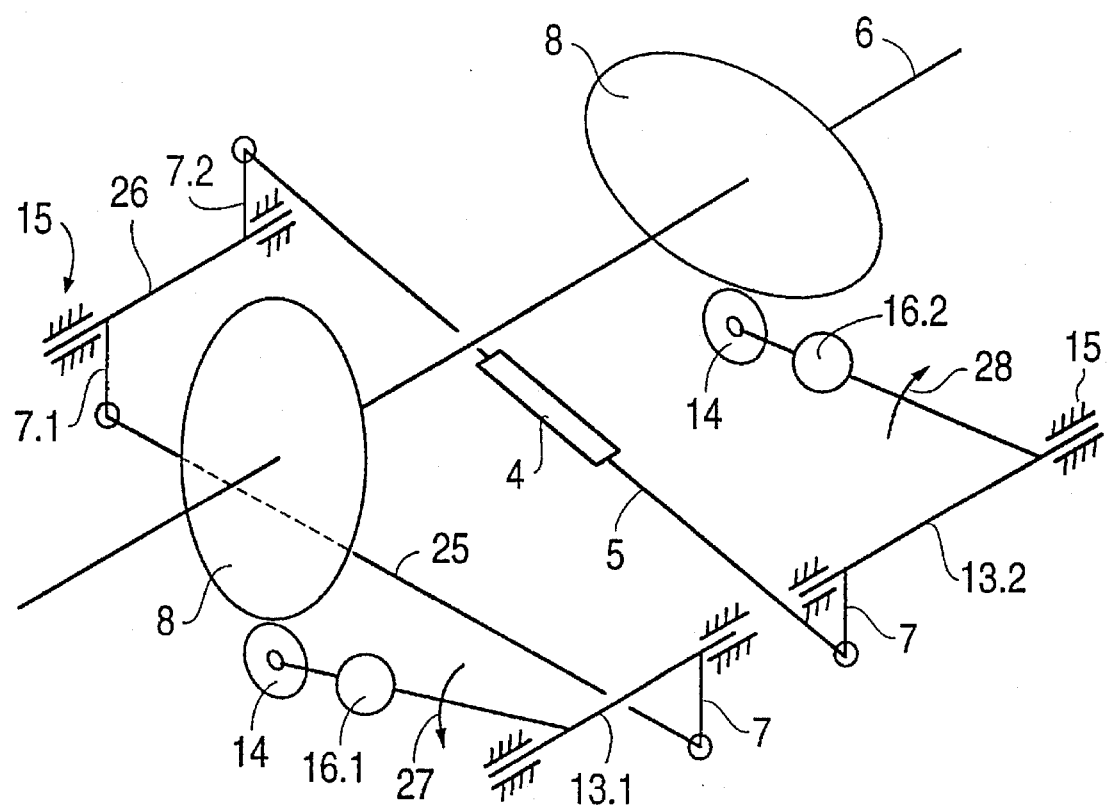
FIG. 4 is a schematic representation of a modified embodiment of the invention where the balancing masses move in opposite directions.

FIG. 4 shows a modified embodiment of the invention for the forced guidance of balancing masses which are moved in opposite directions. Like components in FIG. 4 are provided with the same reference numerals as those in FIG. 1. In the modification according to FIG. 4, the two pivoting shafts 13.1 and 13.2 with which balancing masses 16.1 and 16.2 comprising pivoting arms are connected, are disposed on one side of crankshaft axis 6, and could be positioned to be coaxial with one another. The two pivoting shafts 13.1 and 13.2 are connected in the embodiment of FIG. 4 via transfer body 7, a coupling member 25, transfer body 7.1, coupling shaft 26, which is parallel to both of the pivoting shafts 13.1 and 13.2, transfer body 7.2, and corresponding coupling means 5, 7 to the pivoting shaft 13.2. The transfer body 7 on the pivoting shaft 13.1 and the affiliated transfer body 7.1 on the coupling shaft 26 are connected to each other via the coupling member 25 in such a way that the pivoting shaft 13.1 and the coupling shaft 26 perform a reciprocating rotation in the same direction.

A transfer body 7.2 is disposed on the coupling shaft 26, and is connected to the corresponding transfer body 7 on the pivoting shaft 13.2 via coupling element 5. Coupling element 5 includes adjusting means for changing its working length. The transfer body 7.2 on the coupling shaft 26 is aligned in such a way that the pivoting shaft 13.2 undergoes a reciprocating rotation in the opposite direction to the pivoting shaft 13.1. As a result, a downwardly directed pivoting motion of the balancing mass 16.1, as shown by arrow 27, occurs together with an upwardly directed pivoting motion of the balancing mass 16.2, as indicated by arrow 28. Thus, the roller elements 14 of both balancing masses always rest against the corresponding control contours 8, which are designed for a reciprocating motion of the balancing masses in opposite directions and matched to one another.

Figure 5:
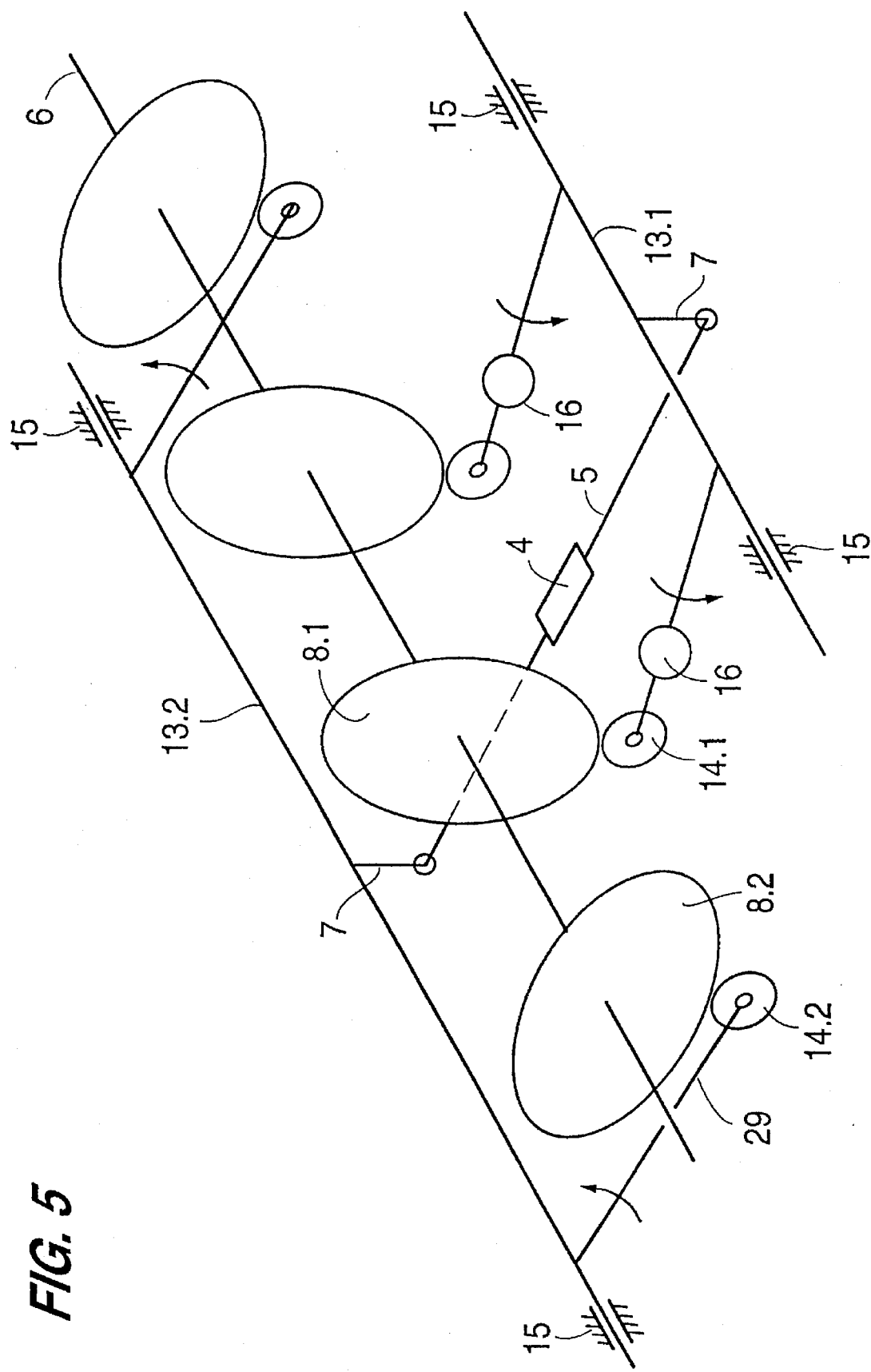
FIG. 5 is a schematic representation of a modified embodiment of the invention where the balancing masses move in the same direction.

FIG. 5 is an embodiment of an arrangement adapted to be used in a four-cylinder reciprocating piston engine. Two pivoting shafts 13.1 and 13.2 are provided with this arrangement, the shafts being connected to each other via coupling means 5, 7 in such a way that both pivoting shafts carry out a reciprocating rotation in the same direction.

At least two cam plates are disposed on the corresponding crankshaft having an axis of rotation 6, namely a cam plate 8.1, which runs in a direction opposite to the associated cam plate 8.2. One of the masses 16 connected to pivoting shaft 13.1 and comprising a pivoting arm, rests against cam plate 8.1 via roller element 14.1. Another balancing mass 16 is also connected to the pivoting shaft 13.1 upon which a corresponding cam plate can likewise act as shown in FIG. 5.

Pivoting shaft 13.2 is connected via a pivoting lever 29 with the lowest possible mass, and to a corresponding roller element 14.2 in effective connection with a cam plate 8.2. Cam plate 8.2 is associated with the cam plate 8.1 and matched to its motion, so that an upward movement of the mass 16, caused by cam plate 8.1, causes roller element 14.2 to follow, in an upward movement, the control contour of the cam plate 8.2 the via the coupling means 5, 7, the pivoting shaft 13.2, and the lifting arm 29, so that in this manner a force-guided reciprocal movement of the balancing masses 16 is caused, wherein the two balancing masses 16 move up and down in the same direction.

We claim:

1. A reciprocating piston engine comprising:

a housing;

a cylinder disposed in the housing;

a piston guided for reciprocation within the cylinder;

a crankshaft connected to the piston for effecting a guided reciprocation thereof within the cylinder;

at least two camplates connected to the crankshaft such that they rotate together with the crankshaft, each camplate defining a control contour thereon;

two balancing masses operatively coupled to the camplates such that the camplates are adapted to actuate respective ones of the balancing masses, each balancing mass comprising a pivoting arm; and coupling means connecting the balancing masses to one another thereby effecting a forced reciprocation thereof as a function of a rotation of the crankshaft, the coupling means including:

two pivoting shafts disposed on each side of the crankshaft and extending parallel thereto, each pivoting shaft being connected to at least one balancing mass, each balancing mass being aligned in a direction of a main extension thereof perpendicularly with respect to each pivoting shaft; and coupling components connecting the pivoting shafts to one another.

2. The engine according to claim 1, wherein the coupling components include:

two transfer bodies, each transfer body being connected to a respective pivoting shaft; and an inelastic coupling element connecting the transfer bodies with one another.

3. The engine according to claim 2, wherein:

each transfer body comprises a positive engagement wheel; and the inelastic coupling element comprises an endless inelastic coupling element adapted to be deflected in at least one direction, the inelastic coupling element further being operatively coupled with each positive engagement wheel.

4. The engine according to claim 2, further comprising an adjusting means connected to the coupling element for changing an effective length thereof.

5. The engine according to claim 1, wherein each balancing mass defines a recess at a free end thereof such that the recess of one balancing mass encompasses a pivoting shaft connected to another balancing mass.

6. The engine according to claim 1, further including a rocker lever having arms of equal length and a support, the support of the rocker lever being pivotably connected on the engine housing, the rocker lever further being disposed to be parallel to the crankshaft for effecting a forced guidance of the cylinder and being connected at each of its ends to one of the balancing masses thereby being operatively coupled to respective control contours of the camplates.

7. The engine according to claim 6, further including an adjustable means for tolerance compensation being connected to the support of the rocker lever.

* * * * *